(12) United States Patent
Quinlan et al.

(10) Patent No.: US 9,157,556 B2
(45) Date of Patent: Oct. 13, 2015

(54) VEHICLE EXHAUST TIP ASSEMBLY

(71) Applicants: Neill A Quinlan, Novi, MI (US); Jeffrey R Lee, Windsor (CA)

(72) Inventors: Neill A Quinlan, Novi, MI (US); Jeffrey R Lee, Windsor (CA)

(73) Assignee: FCA US LLC, Auburn Hills, MI (US)

( * ) Notice: Subject to any disclaimer, the term of this patent is extended or adjusted under 35 U.S.C. 154(b) by 219 days.

(21) Appl. No.: 13/657,978

(22) Filed: Oct. 23, 2012

(65) Prior Publication Data

US 2014/0110009 A1 Apr. 24, 2014

(51) Int. Cl.
*F16L 9/00* (2006.01)

(52) U.S. Cl.
CPC ........................ *F16L 9/00* (2013.01)

(58) Field of Classification Search
CPC ........................................................ F16L 9/00
USPC .................................. 138/110, 109
See application file for complete search history.

(56) References Cited

U.S. PATENT DOCUMENTS

| | | | |
|---|---|---|---|
| 2,850,314 A | | 11/1952 | Haigh et al. |
| 2,620,893 A | * | 12/1952 | Rountree et al. ............... 55/476 |
| 2,992,035 A | | 7/1961 | Tell et al. |
| 3,752,260 A | * | 8/1973 | Heath ........................... 181/228 |
| 3,835,892 A | * | 9/1974 | Keller ............................ 138/178 |
| 3,908,372 A | * | 9/1975 | Fowler et al. .................... 60/320 |
| 4,356,885 A | * | 11/1982 | Dello ............................ 181/227 |
| 4,589,515 A | * | 5/1986 | Omura .......................... 181/227 |
| 5,443,098 A | * | 8/1995 | Kertesz ......................... 138/109 |
| 5,466,900 A | * | 11/1995 | Knapp .......................... 181/227 |
| 6,173,701 B1 | | 1/2001 | Azuma |
| 7,007,720 B1 | | 3/2006 | Chase et al. |
| 7,152,710 B1 | * | 12/2006 | Huang et al. ................... 181/227 |
| 7,686,131 B1 | | 3/2010 | Osterkamp et al. |
| 2007/0240934 A1 | | 10/2007 | Van de Flier et al. |

OTHER PUBLICATIONS

Chrysler Fascia Mounted Exhaust Tip in use on vehicles on sale prior to Oct. 23, 2011.

\* cited by examiner

*Primary Examiner* — Donnell Long
(74) *Attorney, Agent, or Firm* — Ralph E. Smith

(57) ABSTRACT

An exhaust tip assembly for an exhaust system of a vehicle includes an accent member and a collector member that is made substantially from a polymeric material. The collector member includes a collector portion and an attachment portion. The collector portion includes a first end and a second end. The collector portion defines a passage that extends from the first end to the second end. The first end is operable to receive a downstream end of a tailpipe, and the second end is operable to removably attach to the accent member. The attachment portion is configured to mount to a fascia member of a vehicle to thereby expose the accent member from the fascia member.

20 Claims, 2 Drawing Sheets

VEHICLE EXHAUST TIP ASSEMBLY

FIELD

The present disclosure relates to an exhaust tip assembly and, more particularly, relates to a fascia-mounted exhaust tip assembly with an integrated collector/attachment bracket and accent ring.

BACKGROUND

Cars, trucks, vans, sports utility vehicles (SUVs), motorcycles, and other vehicles often include an internal combustion engine that produces exhaust gases. These gases are directed away from the vehicle by an exhaust system. The exhaust system can include one or more pipes through which the exhaust flows. The exhaust system can also include a muffler for reducing engine noise. Moreover, the exhaust system can terminate at a tailpipe, which extends to the rear of the vehicle or the side of the vehicle.

In some cases, the tailpipe can be an eyesore and can detract from the aesthetics of the vehicle. For instance, the tailpipe can clash with the exterior color or other exterior surfaces of the vehicle. Also, the tailpipe can collect ugly residue (e.g., carbon deposits) from the exhaust gas.

SUMMARY

An exhaust tip assembly for an exhaust system of a vehicle is disclosed. The exhaust system includes a tailpipe with a downstream end, and the vehicle also includes a fascia member. The exhaust tip assembly includes an accent member and a collector member that is made substantially from a polymeric material. The collector member includes a collector portion and an attachment portion. The collector portion includes a first end and a second end. The collector portion defines a passage that extends from the first end to the second end. The first end is operable to receive the downstream end of the tailpipe, and the second end is operable to removably attach to the accent member. The attachment portion is configured to mount to the fascia member of the vehicle to thereby expose the accent member from the fascia member.

A vehicle is also disclosed that includes a tailpipe having a downstream end. The vehicle also includes a fascia member that is disposed adjacent the tailpipe. Moreover, the vehicle includes an accent member and a single-body collector member that includes a collector portion and an attachment portion. The collector portion includes a first end and a second end. The collector portion defines a passage that extends from the first end to the second end. The first end is operable to receive the downstream end of the tailpipe. The second end is operable to removably attach to the accent member. The attachment portion is configured to mount to the fascia of the vehicle to thereby expose the accent member from the fascia.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

Figure 1:
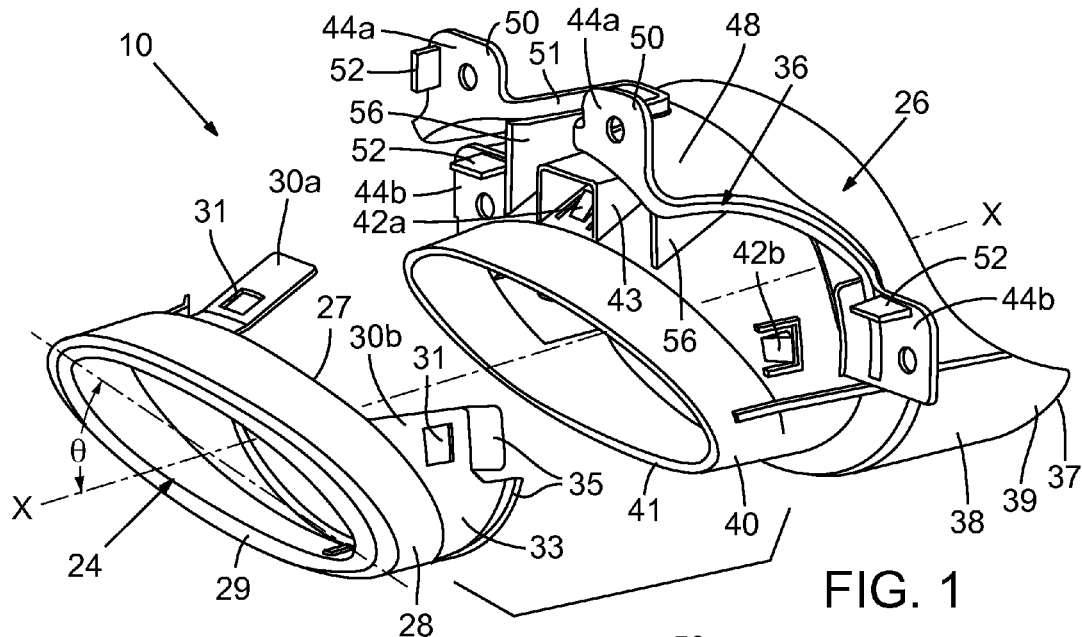
FIG. 1 is an exploded, perspective, upstream view of an exhaust tip assembly according to exemplary embodiments of the present disclosure.

Referring to the Figures, an exhaust tip assembly 10 (FIGS. 1-3) for an exhaust system 12 of a vehicle 18 (FIG. 3) is illustrated according to various exemplary embodiments. The assembly 10 can generally include an accent member 24 and a collector member 26 (FIG. 1), each of which will be described in detail. As will be discussed, the assembly 10 can at least partially conceal portions of the exhaust system 12, and exposed portions of the assembly 10 can be aesthetically pleasing such that the assembly 10 can enhance the appearance of the vehicle 18. Moreover, the exhaust tip assembly 10 can be manufactured in a cost effective and efficient manner. Additionally, the exhaust tip assembly 10 can be relatively lightweight and can include relatively few parts.

As is known, the exhaust assembly 12 can direct exhaust gas away from an engine (not shown) of the vehicle 18. The exhaust assembly 12 can include one or more pipes that can be made from steel or other metal. The exhaust assembly 12 can also include a muffler 14 (FIG. 3) for reducing engine noise. Moreover, the exhaust assembly 12 can include a tailpipe 16 (shown in phantom in FIG. 3) that is fixedly attached to the muffler 14, that extends away from the muffler 14, and that terminates at a downstream end 17 thereof.

The vehicle 18 can also include a fascia member 20 (FIG. 3) that is disposed adjacent the tailpipe 16. In the embodiments illustrated, the fascia member 20 is part of a rear bumper of the vehicle 18, and the downstream end 17 of the tailpipe 16 is disposed slightly inboard relative to the fascia member 20. It will be appreciated that the fascia member 20 could be part of a side body panel (i.e., outboard body panel) or other part of the vehicle 18 without departing from the scope of the present disclosure.

Figure 3:
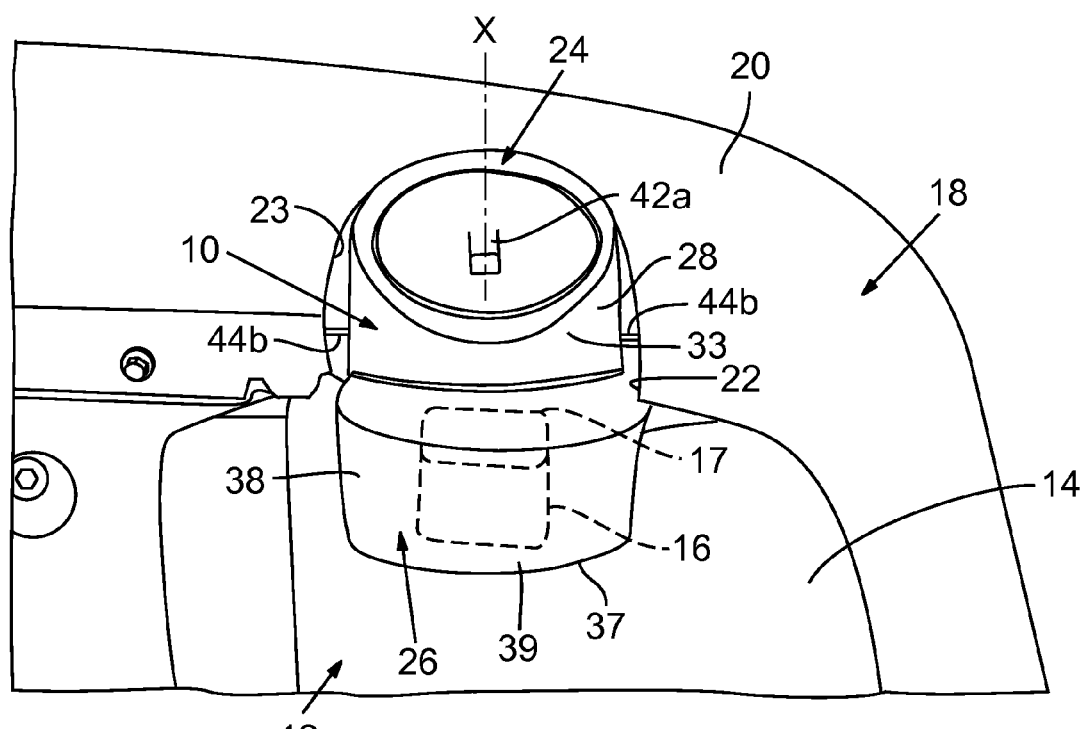
FIG. 3 is a plan view of an underside of a vehicle with the exhaust tip assembly of FIG. 1 shown operably coupled to an exhaust system of the vehicle.

Moreover, the fascia member 20 can include an inner surface 22 to which the exhaust tip assembly 10 is attached as will be discussed. The fascia member 20 can also include an opening 23 that provides clearance for the exhaust tip assembly 10. In the embodiments of FIG. 3, the opening 23 is arcuate in shape such that the exhaust tip assembly 10 can substantially nest within the opening 23. However, it will be appreciated that the opening 23 could have any other suitable shape (e.g., a round or ovate through-hole, etc.) without departing from the scope of the present disclosure.

Figure 2:
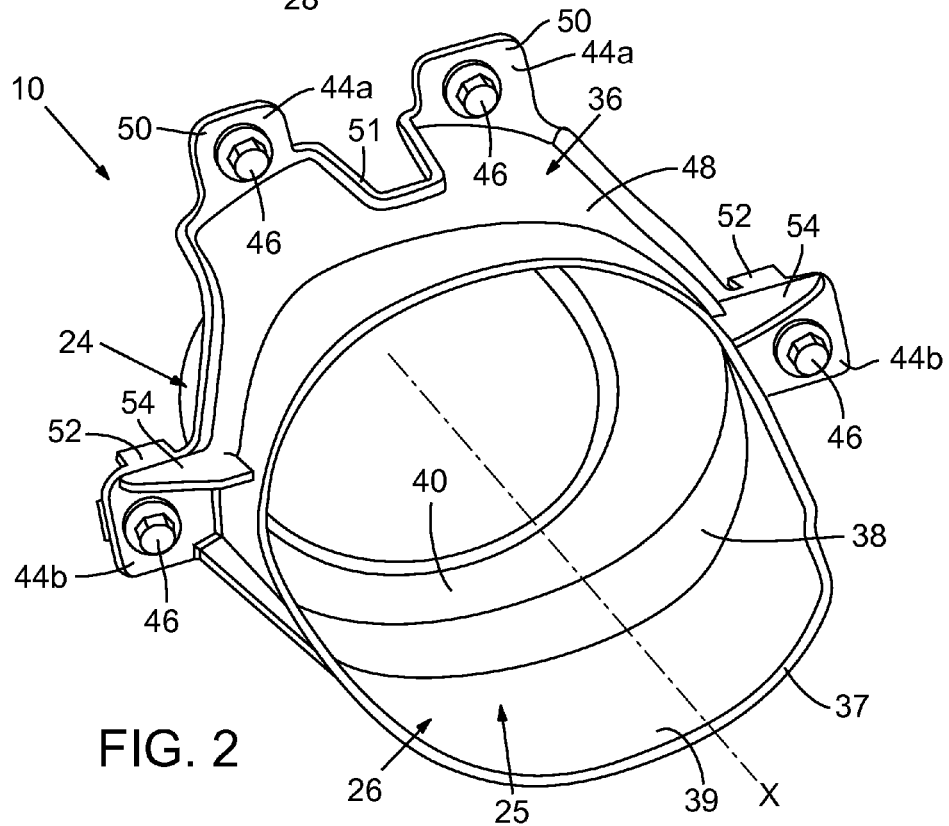
FIG. 2 is an assembled, perspective, downstream view of the exhaust tip assembly of FIG. 1.

Referring now to FIGS. 1 and 2, the exhaust tip assembly 10 will be discussed in detail. As mentioned, the assembly 10 can include an accent member 24. The accent member 24 can include an annular portion 28 and one or more mounting flanges 30a, 30b. The annular portion 28 and the mounting flanges 30a, 30b can be integrally connected so as to be monolithic (i.e., a single-body or uni-body construction).

As will be explained, the accent member 24 can be exposed from the fascia member 20 when viewed from the rear of the vehicle 18; therefore, the accent member 24 can have an aesthetically pleasing appearance. For instance, the accent member 24 can be at least partially made from a highly reflective material, such as chrome, or the accent member 24 can be made from stainless steel or other suitable material. The accent member 24 can be manufactured in any suitable fashion, such as stamping, machining, molding, etc.

As shown in FIG. 1, the annular portion 28 can be annular with an axis X extending therethrough. The annular portion 28 can include an upstream rim 27 and a downstream rim 29 that are opposite and substantially parallel to each other. The rims 27, 29 can be beveled at an angle θ relative to the axis X (i.e., cut on a bias angle θ).

Moreover, the flanges 30a, 30b can include an upper mounting flange 30a, and a side mounting flange 30b. The upper mounting flange 30a can be flat and rectangular and somewhat resiliently flexible in the radial direction. The upper mounting flange 30a can extend in the upstream direction from the upstream rim 27 of the annular portion 28. Also, the upper mounting flange 30a can include an opening 31 (e.g., a rectangular through-hole) therein. On the other hand, the side mounting flange 30b can be defined by an arcuate scoop 33 that extends partially around the axis X and that projects upstream along the axis X from the lower quadrants of the upstream rim 27. The side flange 30b can also include one or more openings 31, one of which is shown in FIG. 1. The opening 31 can be a rectangular through hole that extends through the scoop 33. Although not shown in FIG. 1, there can be an additional opening 31 on the scoop 33 on the opposite side of the axis X. Moreover, the scoop 33 can include one or more ramp surfaces 35. The ramp surfaces 35 can angle radially away from the axis X.

As shown in FIG. 1, the collector member 26 can include an annularly shaped collector portion 34 and an attachment portion 36, which are integrally connected so as to be monolithic (i.e., the collector member 26 can be a single-body, can have a uni-body construction, etc.).

The collector member 26 can be made from a material that can withstand the high temperature exhaust gasses flowing out of the tailpipe 16. For instance, the collector member 26 can be made from a polymeric material that is operable to withstand at least an hour of exposure to 450° F. Also, the collector member 26 can have a dark color (e.g., substantially black). As such, if and when carbon or other dark deposits build up on the collector member 26 from exposure to the exhaust gasses, the deposits will be less visible. Specifically, the collector member 26 can be made from ZYTEL™ material (e.g., ZYTEL™ 95G40DH1T) which is commercially available from DuPont Corporation, headquartered in Wilmington, Del. Accordingly, the collector member 26 can be lightweight and can be constructed via molding processes to include complex curving surfaces, etc. It is noted that, in the embodiments illustrated, the collector member 26 has substantially constant wall thicknesses and includes sufficient draft angles to facilitate molding processes. However, it will be appreciated that the collector member 26 could be manufactured by machining, stamping, or other processes without departing from the scope of the present disclosure.

The collector portion 34 can include a first end 38 (i.e., an upstream end) that terminates at an upstream rim 37 and a second end 40 (i.e., a downstream end) that terminates at a downstream rim 41. The collector portion 34 can also extend annularly around the axis X such that a passage 25 is defined continuously through the collector portion 34 from the first end 38 to the second end 40. The first end 38 can have a larger radius than the second end 40, and the radius can gradually decrease along the axis X moving from the first end 38 to the second end 40.

As best illustrated in FIG. 2, the upstream rim 37 can define a scoop 39 that projects along the axis X from the lower quadrants of the first end 38. Also, as shown in FIG. 1, the downstream rim 41 can be beveled, for instance, at the same angle θ as the accent member 24 (i.e., cut on a bias angle θ).

The collector portion 34 can also include a plurality of projections 42a, 42b that project radially away from the outer surface of the collector portion 34 away from the axis X. The projections 42a, 42b can be generally triangular in shape. The projections 42a, 42b can be positioned on the collector portion 34 approximately midway between the first and second ends 38, 40. The number and position of the projections 42a, 42b can correspond to that of the flanges 30a, 30b of the accent member 24. For instance, there can be an upper projection 42a that is operable to be received within the opening 31 of the upper flange 30a of the accent member 24, and there can be two side projections 42b that are operable to be received in respective ones of the openings 31 of the side flanges 30b of the accent member 24. The collector portion 34 can also include a hollow box 43 that surrounds the upper projection 42a and that is open toward the accent member 24.

Thus, in order to connect the accent member 24 to the collector member 26, the accent member can be disposed coaxially with the collector member 26 (as shown in FIG. 1) and moved parallel to the axis X toward the second end 40 of the collector member 26. The flanges 30a, 30b can collectively receive the second end 40 of the collector member 26, and the ramp surfaces 35 can slidingly advance over the projections 42a, 42b to resiliently flex the flanges 30a, 30b radially outward. As the accent member 24 further advances toward the collector member 26, the projections 42a, 42b can enter the respective openings 31. Accordingly, the accent member 24 can removably couple (i.e., snap-fit) to the second end 40 of the collector portion 34 of the collector member 26. In this position, the annular portion 28 of the accent member 24 can extend about and receive the second end 40 of the collector portion 34 to cover the downstream rim 41 and a portion of the outer diameter surface of the second end 40. Also, because the accent member 24 can snap-fit to the collector member 26, the assembly of the exhaust tip assembly 10 can be relatively simple. It will be appreciated, however, that the accent member 24 can removably couple to the collector member 26 in other ways without departing from the scope of the present disclosure.

The attachment portion 36 of the collector member 26 can generally project radially away from the collector portion 34. As such, the attachment portion can be configured to mount to the inner surface 22 of the fascia member 20.

Specifically, the attachment portion 36 can include a plurality of flanges 44a, 44b. There can be any number, shape, and configuration of flanges 44a, 44b. For instance, the flanges 44a, 44b can be numbered, shaped, and/or configured in way that corresponds to the inner surface 22 of the fascia member 20 such that the attachment portion 36 can attach thereto.

In the embodiments illustrated, there are two upper flanges 44a that are disposed adjacent each other adjacent the apex of the collector member 26. The two upper flanges 44a can be defined by a curved portion 48 that curves radially upward and away from the collector portion 34 and then curves in the downstream direction. The curved portion 48 can be reinforced by ribs 56 that are planar and that extend radially between the outer surface of the collector portion 34 and the curved portion 48. The curved portion 48 can split into two upturned portions 50 that are separated by an axial opening 51 (i.e., a wide notch). As shown in FIG. 2, fasteners 46 can extend through the upturned portions 50 to attach the same to the inner surface 22 of the fascia member 20. In some embodiments, the inner surface 22 can include a prepared mounting block or other mounting member(s) to which the fasteners 46 can attach.

Also, in the embodiments illustrated there are two side flanges 44b that are disposed on opposite sides of the axis X. The side flanges 44b can be rectangular, can extend substantially perpendicular to the axis X, and can extend radially outward from the collector portion 34. Moreover, the attachment between the side flanges 44b and the collector portion 34 can be reinforced by respective ribs 54 that are substantially triangular and that extend parallel to the axis X in the upstream direction. The side flanges 44b can also include tabs 52 that are rectangular and that extend parallel to the axis X in the downstream direction. As shown in FIG. 2, fasteners 46 can extend through the side flanges 44b to attach the same to the inner surface 22 of the fascia member 20 (e.g., to a mounting block or other mounting member(s) defining the inner surface 22).

FIG. 3 illustrates embodiments of the exhaust tip assembly 10 mounted to the inner surface 22 of the fascia member 20 of the vehicle 18. In this position, the downstream end 17 of the tailpipe 16 can be received in the passage 25 via the first end 38 of the collector portion 34. The second end 40 can extend axially therefrom such that the accent member 24 can project slightly rearward from the opening 23 in the fascia member 20. Therefore, persons behind the vehicle 18 are more likely to see the accent member 24 than the collector member 26 and/or the tailpipe 16.

Moreover, when the exhaust tip assembly 10 is viewed from below (FIG. 3), the scoop 39 of the collector portion 34 can further conceal the tailpipe 16. Also, the scoop 33 of the accent member 24 can cover the collector member 26. Thus, even from below, the exhaust tip assembly 10 can give the vehicle 18 a clean, fit appearance.

Accordingly, the exhaust tip assembly 10 can improve the aesthetics of the vehicle 18. Also, the assembly 10 can be assembled and attached to the fascia member 20 relatively easily and quickly. Moreover, because the collector member 26 can be made substantially from a polymeric material, the assembly 10 can be relatively lightweight to thereby improve fuel economy of the vehicle 18. Moreover, the collector member 26 can colored black such that the collector member 26 is unlikely to show discoloration due to carbon buildup from the exhaust gasses.

What is claimed is:

1. An exhaust tip assembly for an exhaust system of a vehicle, the exhaust system including a tailpipe with a downstream end, the vehicle also including a fascia member, the exhaust tip assembly comprising:
   an accent member; and
   a monolithic collector member that is made substantially from a polymeric material operable to withstand high temperature exhaust gasses flowing out of the tailpipe, the collector member including a collector portion and an attachment portion, the collector portion including a first end, and a second end, the collector portion defining a passage that extends from the first end to the second end and a longitudinal axis that extends within the passage, the first end having lower quadrants disposed below the longitudinal axis, the first end operable to receive the downstream end of the tailpipe, the second end operable to removably attach to the accent member, the attachment portion configured to mount to the fascia member of the vehicle to thereby expose the accent member from the fascia member,
   wherein the accent member extends about and covers only part of the collector portion at the second end,
   wherein the collector portion includes a lower scoop extending from only the lower quadrants of the first end in a direction substantially parallel to the longitudinal axis to conceal a portion of the tailpipe.

2. The exhaust tip assembly of claim 1, wherein the accent member includes an annular portion.

3. The exhaust tip assembly of claim 2, wherein the annular portion receives the second end of the collector portion.

4. The exhaust tip assembly of claim 2, wherein the accent member also includes at least one mounting flange that is integrally connected to the annular portion, the at least one mounting flange of the accent member operable to attach to the second end of the collector portion.

5. The exhaust tip assembly of claim 4, wherein the at least one mounting flange of the accent member is operable to snap-fit to the second end of the collector portion.

6. The exhaust tip assembly of claim 1, wherein the accent member is at least partially made from one of chrome and stainless steel.

7. The exhaust tip assembly of claim 1, wherein the attachment portion includes at least one flange that projects radially away from the collector portion.

8. The exhaust tip assembly of claim 7, further comprising at least one fastener that extends through the at least one flange of the attachment portion for mounting the at least one flange of the attachment portion to the fascia member.

9. The exhaust tip assembly of claim 1, wherein the polymeric material is operable to withstand at least an hour of exposure to at least 450° F.

10. The exhaust tip assembly of claim 1, wherein the polymeric material is substantially black in color.

11. The exhaust tip assembly of claim 1, wherein the lower scoop and part of the first end define an upstream rim of the collector portion that has a non-linear side profile.

12. The exhaust tip assembly of claim 1, wherein the lower scoop and part of the first end define an upstream rim of the collector portion that has a curved side profile.

13. A vehicle comprising:
   a tailpipe having a downstream end;
   a fascia member that is disposed adjacent the tailpipe;
   an accent member including at least one mounting flange defining an opening therein; and
   a single-body collector member made substantially from a polymeric material operable to withstand high temperature exhaust gasses flowing out of the tailpipe, the single-body collector member including a collector portion and an attachment portion, the collector portion including a first end and a second end, the collector portion defining a passage that extends from the first end to the second end and a longitudinal axis that extends within the passage, the first end operable to receive the downstream end of the tailpipe, the second end operable to removably attach to the accent member, the attachment portion configured to mount to the fascia of the vehicle to thereby expose the accent member from the fascia, the first end of the collector portion terminating at an upstream rim and the second end of the collector portion terminating at a downstream rim, the single-body collector member including at least one projection disposed along the collector portion between the upstream and downstream rims that extends outwardly at an angle such that the at least one projection progressively protrudes further away from the collector portion moving towards the upstream rim,
   wherein the opening in the at least one mounting flange of the accent member operably receives the at least one projection when the accent member is moved into contact with the single-body collector member in a single engagement direction that is parallel to the longitudinal axis.

14. The vehicle of claim 13, wherein the accent member is at least partially made from one of chrome and stainless steel.

15. The vehicle of claim 13, wherein the single body collector member includes a hollow box surrounding the at least one projection that is open toward the accent member and that is operable to receive the at least one mounting flange of the accent member when the accent member is moved toward the single-body collector member such that the hollow box of the single-body collector and the at least one mounting flange of the accent member cooperate to guide the accent member along the single engagement direction.

16. The vehicle of claim 13, wherein the collector portion includes a lower scoop that projects longitudinally from the first end of the collector portion such that the lower scoop is disposed below the longitudinal axis, the lower scoop configured to conceal the tailpipe when viewed from underneath the vehicle.

17. The vehicle of claim 13, wherein the attachment portion includes at least one flange that projects radially away from the collector portion.

18. The exhaust tip assembly of claim 17, further comprising at least one fastener that extends axially through the at least one flange of the attachment portion for mounting the at least one flange of the attachment portion to the fascia member.

19. The vehicle of claim 13, wherein the polymeric material is operable to withstand at least an hour of exposure to at least 450° F.

20. The vehicle of claim 13, wherein the polymeric material is substantially black in color.

* * * * *